Patented June 15, 1954

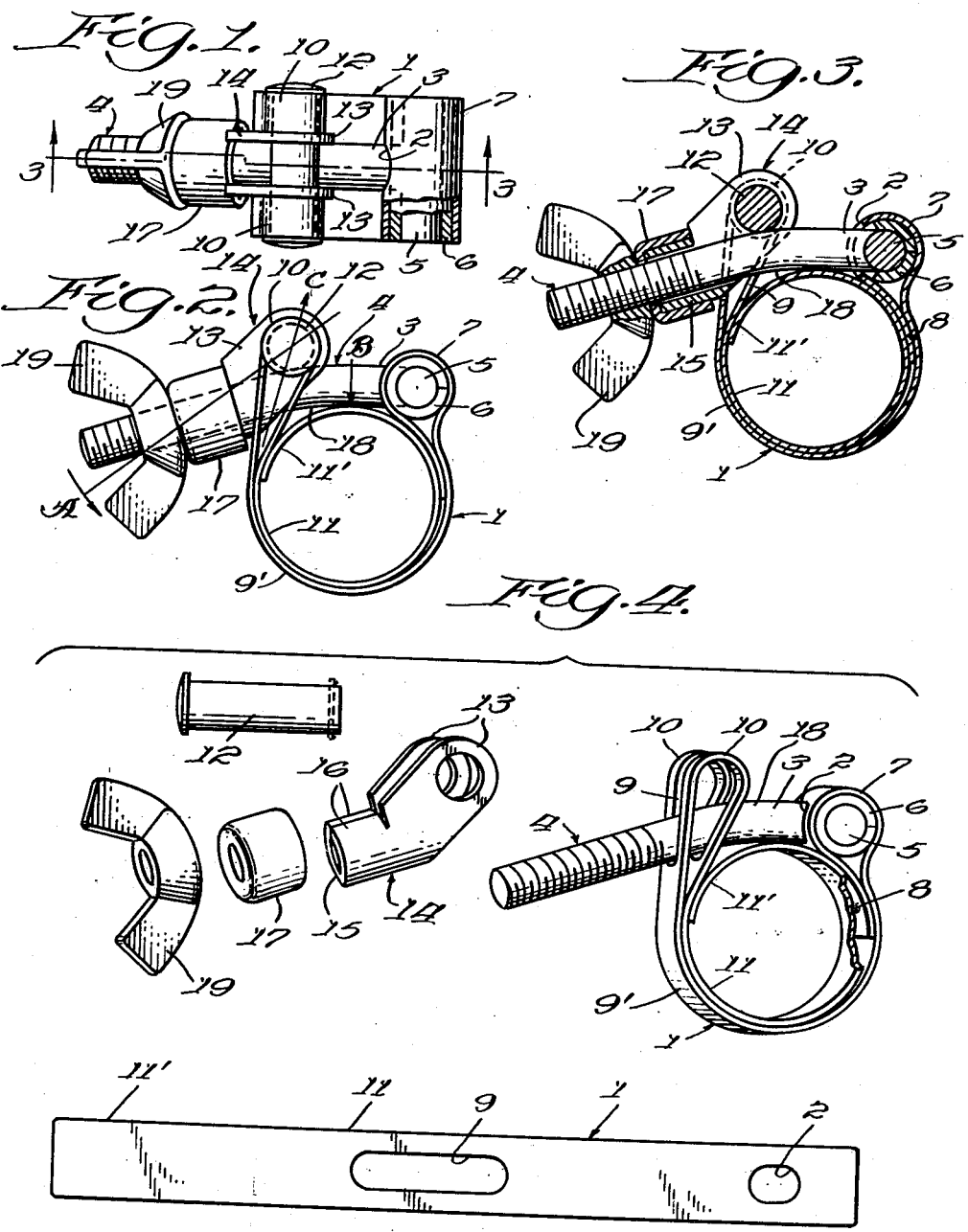

2,680,892

UNITED STATES PATENT OFFICE 2,680,892

HOSE CLAMP

James T. King, Glendale, Calif.

Application August 23, 1951, Serial No. 243,306

3 Claims. (Cl. 24—279)

This invention relates to hose clamps and particularly to an improved form thereof including clamping means constructed and arranged to be urged laterally toward the periphery of the hose being clamped incident to tightening of the clamp closing means.

Heretofore the general design of hose clamps has included various types of closing means (usually screw operated) in which the closing means operates in a line parallel to and spaced outwardly from a line tangential to the surface of the hose or the like being clamped and which means during the application of clamping pressure maintains the axial position on the line spaced from the periphery of the hose or the like subjected to clamping action.

An object of the present invention is to provide an improved form of clamp for encircling circular or similar objects for clamping them to other objects encircled thereby. Usually, the clamps of this type are employed to clamp hose ends over the ends of pipes or coupling members and hence are referred to as "hose clamps," and in the following specification, the present invention will be termed a hose clamp for convenience, but such term it not to be construed as limiting the scope of the invention since the clamp of the invention may be employed for clampingly encircling objects other than hose ends.

Another object of the invention is to provide a hose clamp employing closing means comprising a T-bolt at one end engaging a trunnion member at the other end and in which the trunnion is so constructed and arranged as to tend to urge the T-bolt laterally toward the periphery of the object engaged by the clamp as tightening pressure is applied.

A further object of the invention is to provide a hose clamp having a hose engaging band which extends around the object being clamped and includes an overlapping portion effective to reduce the coefficient of friction incident to being tightened.

Still another object of the invention is to provide a hose clamp embodying the foregoing objectives, which is simple and economical to manufacture and which is reliable in use.

With the foregoing objects in view, together with such additional objects and advantages as shall subsequently appear, the invention resides in the parts, and in the construction, combination and arrangement of parts, disclosed by way of example in the following specification of a mode of execution of the invention; reference being also had to the accompanying drawings which form a part of said specification and in which drawings:

Fig. 1 is a top plan view of a hose clamp embodying the present invention,

Fig. 2 is a side elevation of the hose clamp shown in Fig. 1,

Fig. 3 is a medial transverse sectional view taken on the line 3—3 of Fig. 1,

Fig. 4 is an exploded view of the component parts of the hose clamp shown in the preceding figures; certain of the parts being shown assembled and certain of the parts being shown in perspective for clearness of illustration, and Fig. 5 is a flat plan development of the hose engaging band of the clamp shown in the preceding figures.

In the foregoing description of the drawings and in the following detailed description of the invention, the terms "side" and "top" will be understood to apply only to the positions of the parts as shown in the drawings and not to apply to the subject of the invention in positions of use.

Referring to the invention shown in Figs. 1 to 5, inclusive, the clamp there shown comprises a band 1 preferably formed of resilient metal; said band adjacent one end thereof being provided with a perforation 2 for reception of the shank 3 of a T-bolt 4, the head 5 of which may carry a metal sleeve 6 of the general type shown in my prior Patent No. 2,395,745 granted February 26, 1946. The end of the band 1 adjacent the perforation 2 is bent to form a loop 7 extending over the head of the T-bolt with the end of the band positioned on the inner surface of the band and is secured by a spot welding operation indicated at 8.

Adjacent its mid length, the band 1 is provided with an elongated slot 9 and the band from the loop 7 is bent into a curve of the approximate radius of the surface of the hose or other object for which it is intended. The band at the mid length of the slot 9 is reversely bent toward the loop 7, with resultant formation of a pair of laterally spaced loops 10, 10 but at a greater radial distance from the center about which the band is curved. The opposite end 11' of the band continues in a run 11 from the loops 10, 10 back along the run 9' of the band extending between the perforation 2 and slot 9 and thence across the space between the looped ends 7 and 10, 10 and thence along the inner face of the run 11, adjacent the looped ends 10, 10 and terminates adjacent the diverging point of the runs 9' and 11 incident to the formation of the loops 10, 10. Thus the band completely encircles the object to be clamped thereby.

Pivotally mounted between the adjacent side faces of the loops 10, 10 on a pivot pin 12 extending through said loops are the spaced parallel ear portions 13, 13 of a trunnion member 14 having a bolt guide 15 extending therethrough disposed below the pin 12 and extending at right angles thereto. The trunnion member may conveniently be formed from a blank of sheet metal of modified V-shape bent on itself and the ends 16, 16 thereof which meet to form the bolt guide enclosed by a sheet metal ferrule 17 pressed thereover. Preferably for the smaller sizes of clamps the body of the T-bolt is bent downwardly slightly as indicated at 18 and the threaded end of the T-bolt is engaged by a suitable nut element such as the wing nut 19.

Referring to Fig. 2, it will be noted that as the nut 19 is screwed onto the T-bolt 4 constricting the clamp about a hose or other object, the tendency of the trunnion 14 will be to turn about the pin 12 in the direction indicated by the arrow A due to the fact that the pin 12 is located above the shank of the T-bolt and the fact that the point of engagement of the nut 19 and the ferrule 17 of the trunnion 14 is a considerable distance beyond a line connecting the axes of the pin 12 and the object being clamped. This tendency causes the T-bolt to tend to swing in the same direction about the axis of the head portion thereof and to contact the outer surface of the run 11' of the band forcing it against the hose as indicated by the arrow B and at the same time, the reaction of the trunnion is to tend to move in the direction of the arrow C drawing the runs 9' and 11 into tighter engagement with the hose; the clearance between the juxtaposed surfaces of the bolt guide and the body of the bolt being sufficient to permit limited angular movement therebetween to facilitate the above-described clamping action. The drawing up action of the clamp is appreciably facilitated by the fact that the band completely encircles the hose. Hose material is usually surfaced by some form of rubber which has a very high coefficient of friction and in those prior art clamps in which slippage is necessary between the clamp and the hose incident to tightening of the clamp, difficulty is encountered in preventing the hose from bunching and gathering at the clamp opening. In the present invention, the point of slippage is the adjacent surfaces of the end of the run 11' and the run 11 and since both are of metal, the coefficient of friction between them is much lower than between rubber and metal, and consequently the force required to be applied to effect tightening of the clamp to any given degree of compression is less than would be the case if such tightening also required slippage between the hose and the inner surface of the clamp. Also, since the runs 9' and 11 are relatively slidable on one another, the clamp is uniformly stressed when tightened.

The invention with its embodiment of complete encirclement of the hose over the full width of the band and the accompanying reduction of frictional resistance to tightening is especially adapted for uses involving high pressures and in practice, the simple hand operated wing nut employed has been found sufficient to provide clamping effort capable of withstanding hydraulic pressures as high as 500 p. s. i.

While in the foregoing specification I have described and illustrated one mode of execution of the invention, it is not to be inferred therefrom that the invention is limited to the exact form so disclosed and it is to be understood that the invention embraces all such modifications in the parts, and in the construction, combination and arrangement of parts as shall come within the purview of the appended claims.

I claim:

1. A hose clamp comprising a band formed from a strip of metal having an elongated slot formed therein at about the mid length of said strip and a second elongated slot adjacent one end of said strip; said strip being reversely bent at the mid length of said first slot, with resultant formation of one end of said band into a pair of transversely disposed aligned spaced loops; the portions of said strip extending from said loops in parallel relation to each other and being circularly bent to embrace a hose or the like; the inner of said strip portions forming a complete hose contacting circle and the outer of said strip portions being slightly shorter and terminating in a looped end, a T-bolt having the head thereof in a looped end with the pivotally mounted in said looped end with the shank thereof projecting through said second slot, a trunnion pivotally mounted in said spaced loops, a bolt guide carried by said trunnion disposed wholly at the side of said spaced loops opposite said looped end, a threaded shank on said T-bolt head extending through said bolt guide, and a nut on said threaded shank at the side of said bolt guide remote from said T-bolt head engageable with an end face of said bolt guide; the clearance between the juxtaposed surfaces of said bolt guide and said threaded shank being sufficient to permit angular, relative movement therebetween.

2. A hose clamp comprising a band formed from a strip of metal having an elongated slot formed therein at about the mid length of said strip and a second elongated slot adjacent one end of said strip; said strip being reversely bent at the mid length of said first slot, with resultant formation of one end of said band into a pair of transversely disposed aligned spaced loops; the portions of said strip extending from said loops in parallel relation to each and being circularly bent to embrace a hose or the like; the inner of said strip portions forming a complete hose-contacting circle and the outer of said strip portions being slightly shorter and terminating in a looped end, a T-bolt having the head thereof pivotally mounted in said looped end with the shank thereof projecting through said second slot, a trunnion pivotally mounted in said spaced loops, a bolt guide carried by said trunnion disposed wholly at the side of said spaced loops opposite said looped end, a threaded shank on said T-bolt head extending through said bolt guide, and a nut on said threaded shank at the side of said bolt guide remote from said T-bolt head engageable with an end face of said bolt guide; said spaced loops being disposed at a greater radial distance from the axis about which said strip portions are circularly bent than the axis of the head of said T-bolt and said bolt guide, and said T-bolt shank being disposed between the axis of said spaced loops and the periphery of an object embraced by said clamp; the clearance between the juxtaposed surfaces of said bolt guide and said threaded shank being sufficient to permit angular, relative movement therebetween.

3. A hose clamp comprising a band formed from a strip of metal having an elongated slot formed therein at about the mid length of said strip and a second elongated slot adjacent one end of said strip; said strip being reversely bent at the mid length of said first slot, with resultant formation of one end of said band into a pair of transversely disposed aligned spaced loops; the portions of said strip extending from said loops in parallel relation to each other and being circularly bent to embrace a hose or the like; the innermost of said strip portions forming a complete hose contacting circle and the outermost of said strip portions being slightly shorter and terminating in a looped end, a T-bolt having the head thereof pivotally mounted in said looped end with the shank thereof projecting through said second slot, a pivot pin mounted in and extending between said spaced loops, a trunnion mounted on said pivot pin and disposed between said loops, a bolt guide on said trunnion disposed wholly at the side of said spaced loops opposite said looped end, a threaded shank on said T-bolt extending through said bolt guide, and a nut on said threaded shank at the side of said bolt guide remote from said T-bolt head; the clearance between the juxtaposed surfaces of said bolt guide and said threaded shank being sufficient to permit angular, relative movement therebetween.

References Cited in the file of this patent

UNITED STATES PATENTS

| Number | Name | Date |
|---|---|---|
| 991,769 | Catelain | May 9, 1911 |
| 1,584,498 | Vitek | May 11, 1926 |
| 2,273,578 | King | Feb. 17, 1942 |

FOREIGN PATENTS

| Number | Country | Date |
|---|---|---|
| 303,659 | Great Britain | Jan. 10, 1929 |